(12) United States Patent
Emura (10) Patent No.: US 7,677,615 B2
(45) Date of Patent: Mar. 16, 2010

(54) BUMPER BEAM STRUCTURE FOR VEHICLE

(75) Inventor: Masahiko Emura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/255,155

(22) Filed: Oct. 21, 2008

(65) Prior Publication Data

US 2009/0108599 A1    Apr. 30, 2009

(30) Foreign Application Priority Data

Oct. 26, 2007    (JP) .............................. 2007-278780

(51) Int. Cl.
*B60R 19/02* (2006.01)
*B60R 19/18* (2006.01)

(52) U.S. Cl. ...................... 293/102; 293/120

(58) Field of Classification Search ................. 293/102, 293/117, 120, 121; 296/187.09, 187.1; D12/169
See application file for complete search history.

(56) References Cited

U.S. PATENT DOCUMENTS

| | | | | |
|---|---|---|---|---|
| 4,116,480 A | * | 9/1978 | Crestetto | 293/102 |
| 4,272,114 A | * | 6/1981 | Hirano et al. | 293/133 |
| 4,542,925 A | | 9/1985 | Huber et al. | |
| 6,361,092 B1 | * | 3/2002 | Eagle et al. | 293/102 |
| 6,398,275 B1 | * | 6/2002 | Hartel et al. | 293/102 |
| 6,726,262 B2 | * | 4/2004 | Marijnissen et al. | 293/121 |
| 6,866,313 B2 | * | 3/2005 | Mooijman et al. | 293/120 |
| 6,979,052 B2 | * | 12/2005 | Hess et al. | 296/187.05 |
| 6,994,384 B2 | * | 2/2006 | Shuler et al. | 293/120 |
| 7,163,242 B2 | * | 1/2007 | Shuler et al. | 293/120 |
| 7,407,219 B2 | * | 8/2008 | Glasgow et al. | 296/187.03 |
| 7,568,746 B2 | * | 8/2009 | Jaarda et al. | 293/132 |
| 2007/0200376 A1 | * | 8/2007 | Jaarda et al. | 293/120 |
| 2009/0152883 A1 | * | 6/2009 | Lee | 293/120 |
| 2009/0206618 A1 | * | 8/2009 | Ralston et al. | 293/120 |

FOREIGN PATENT DOCUMENTS

| | | |
|---|---|---|
| DE | 103 29 754 | 4/2005 |
| EP | 1 378 403 | 1/2004 |
| FR | 2 532 600 | 3/1984 |
| JP | 2001-026245 | 1/2001 |

* cited by examiner

*Primary Examiner*—Jason S Morrow
(74) *Attorney, Agent, or Firm*—Rankin, Hill & Clark LLP (57) ABSTRACT

A bumper beam structure is provided. The bumper beam structure has a plurality of vertically long weak parts formed in a front surface of the bumper beam. These weak parts are formed having a predetermined interval along the lengthwise direction of the bumper beam.

3 Claims, 8 Drawing Sheets

FIG.5
(EMBODIMENT)

BUMPER BEAM STRUCTURE FOR VEHICLE

FIELD OF THE INVENTION

The present invention relates to an improvement in a bumper beam structure for a vehicle.

BACKGROUND OF THE INVENTION

A bumper beam in which strength in the lengthwise direction is made uniform is known as a bumper beam structure for a vehicle, as disclosed in Japanese Patent Application Laid-Open Publication No. 2001-26245 (JP 2001-026245 A).

The bumper beam disclosed in JP 2001-26245 A will be discussed below with reference to FIGS. 12 and 13 hereof.

Figure 12:
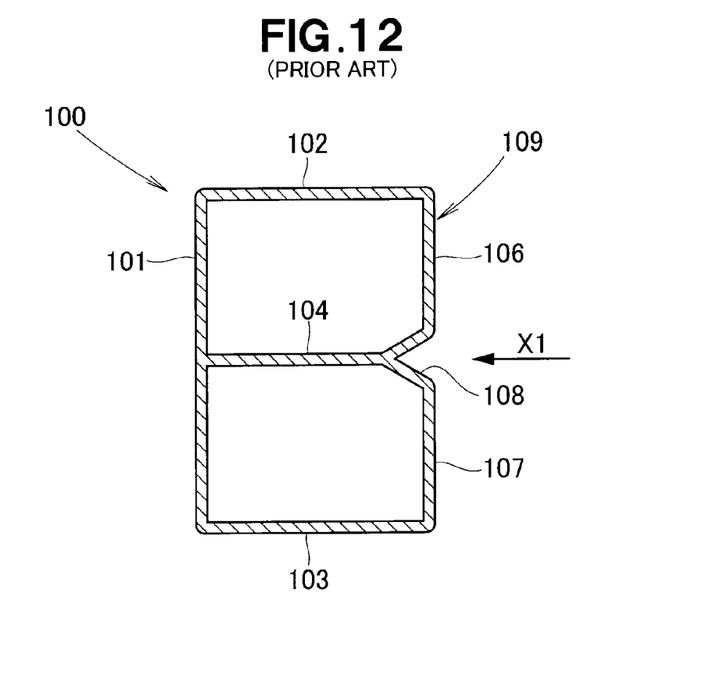
FIG. 12 is a cross-sectional view of a conventional bumper beam.

A reinforcement structure 100 as a bumper beam mounted on a vehicle bumper comprises a back wall 101 provided perpendicular to a loading direction X1; an upper rib 102 and a lower rib 103 that extend from an upper end and a lower end, respectively, of the back wall 101 in an opposite direction from the loading direction X1; a middle rib 104 that extends from the center of the upper and lower ends of the back wall 101 in an opposite direction from the loading direction X1; an upper portion 106 of the front wall that extends downward from the distal end of the upper rib 102; a lower portion 107 of the front wall that extends upward from the distal end of the lower rib 103; and a triangular bead 108 formed by connecting the upper portion 106 of the front wall and the middle rib 104 to each other, and connecting the lower portion 107 of the front wall and the middle rib 104 to each other, as seen in FIG. 12. The upper portion 106 of the front wall and the lower portion 107 of the front wall constitute the front wall 109.

Figure 13:
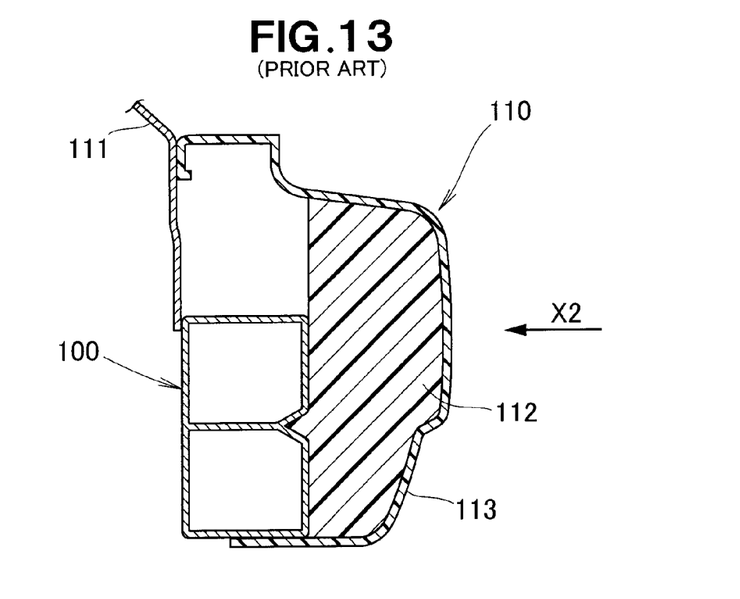
FIG. 13 is a cross-sectional view of a bumper provided with the bumper beam shown in FIG. 12.

FIG. 13 shows the bumper apparatus for housing the bumper beam shown in FIG. 12.

The bumper apparatus 110 of a vehicle comprises a reinforcement structure 100 mounted on a vehicle body 111, a cushioning material 112 disposed in front of the reinforcement structure 100, and an outer casing 113 that covers the reinforcement structure 100 and the cushioning material 112, as seen in FIG. 13.

The reinforcement structure 100 described above is uniformly strong in the lengthwise direction (the front-to-back direction of the drawing surface). Therefore, when the bumper apparatus 110 provided to, e.g., the front end of a subject vehicle has collided with a bumper apparatus of another vehicle, a wall, or other object having a relatively large surface area, a large collision reaction force is generated by receiving the collision load over the entire bumper apparatus 110 of the subject vehicle, and the collision energy is absorbed. However, when the bumper apparatus 110 of the subject vehicle collides with, e.g., the center pillar of a side surface of another vehicle, the collision load is concentrated on the center pillar, and the center pillar greatly deforms because the collision surface area between the bumper apparatus 110 and the center pillar is small.

A preferred bumper beam structure is one that reduces the collision reaction force generated by the bumper beam and suppresses deformation of the collision part even when the surface area of the collision part is small, and generates a sufficient collision reaction force when the surface area of the collision part is large.

SUMMARY OF THE INVENTION

An object of the present invention is to provide a bumper beam structure for a vehicle that can generate considerable collision reaction force when the surface area of the collision part is large, and suppress the collision reaction force when the surface area of the collision part is small.

According to one aspect of the present invention, there is provided a bumper beam structure for a vehicle, which comprises: a bumper beam having a U or rectangular shape in cross section and extending transversely of the vehicle; and a plurality of weak parts provided on the front wall of the bumper beam so as to extend in a vertical direction, wherein the plurality of weak parts is provided at a predetermined pitch along a length of the bumper beam.

A difference in rigidity is generated by the weak parts set at a predetermined pitch along the lengthwise direction of the bumper beam. When a distributed load is applied from a forward direction over a wide range of the bumper beam during a collision of the vehicle, a considerable collision reaction force is generated by the bumper beam receiving the distributed load over a wide surface area. As a result, considerable collision energy is absorbed.

When a concentrated load is applied from a forward direction over a narrow range of the bumper beam during a collision of the vehicle, the bumper beam is made to deform by the concentrated load at a weak part near the collision location acting as a starting point, and the collision reaction force is reduced. As a result, deformation of the collision location of the counterpart vehicle is suppressed.

A difference in rigidity is generated in the lengthwise direction of the bumper beam by the plurality of weak parts, and the collision reaction force generated in accordance with the surface area of the contact with the collision object can be made to be different. For example, in a side collision, the collision reaction force is suppressed when the bumper beam of the subject vehicle deforms about a weak part, as a starting point, when a collision occurs with a pillar having a small surface and belonging to a counterpart vehicle. Thereby, deformation of the pillar is suppressed and the counterpart vehicle can be protected.

Considerable collision reaction force is generated in a head-on collision, considerable collision energy is absorbed, and the subject vehicle can be protected by receiving a collision load over a wide surface area of the bumper beam of the subject vehicle in a collision with, e.g., a bumper beam.

It is preferable that the bumper beam be configured by superimposing two or more plates, and the plurality of weak parts be configured by forming a plurality of slits in at least one of the plates. Plate thickness of the bumper beam is different between a portion in which slits are formed in a single plate and a portion in which slits are not formed in the plate, and the portions in which plate thickness is reduced by formation of the slits are the weak parts.

When a collision load is applied to the bumper beam during a collision of the vehicle, two portions, i.e., the portions other than the weak parts of the bumper beam and the portions in which the slits of the weak parts are not formed, receive the above-described collision load. The strength and rigidity of the weak parts can be modified, and the collision reaction force generated by the bumper beam can be controlled by modifying the thickness of the plate in which slits are not formed.

A difference in plate thickness is formed between a portion in which two or more steel plates are superimposed and a portion in which slits are formed, and a load generated by the collision surface area with a collision object can be made to be different. Moreover, the slits can readily be formed by press molding.

It is preferable that each of the plurality of slits comprises a long, thin rectangular aperture and a triangular aperture formed at the upper and lower ends of the rectangular apertures.

It is preferable that the two or more plates each have a different plate thickness.

It is preferable that the bumper beam comprises a single plate, and the weak parts be configured by forming a plurality of slits in the single plate.

An area between weak parts in the plurality of weak parts provided at a predetermined pitch comprises a non-weak part.

BRIEF DESCRIPTION OF THE DRAWINGS

Certain preferred embodiments of the present invention will be described in detail below, by way of example only, with reference to the accompanying drawings, in which:

FIG. 7 is a view showing a state in which a vehicle provided with the bumper beam of the present embodiment is engaged in a head-on collision with the wall of a building structure or the like;

DETAILED DESCRIPTION OF THE PREFERRED EMBODIMENTS

Figure 1:
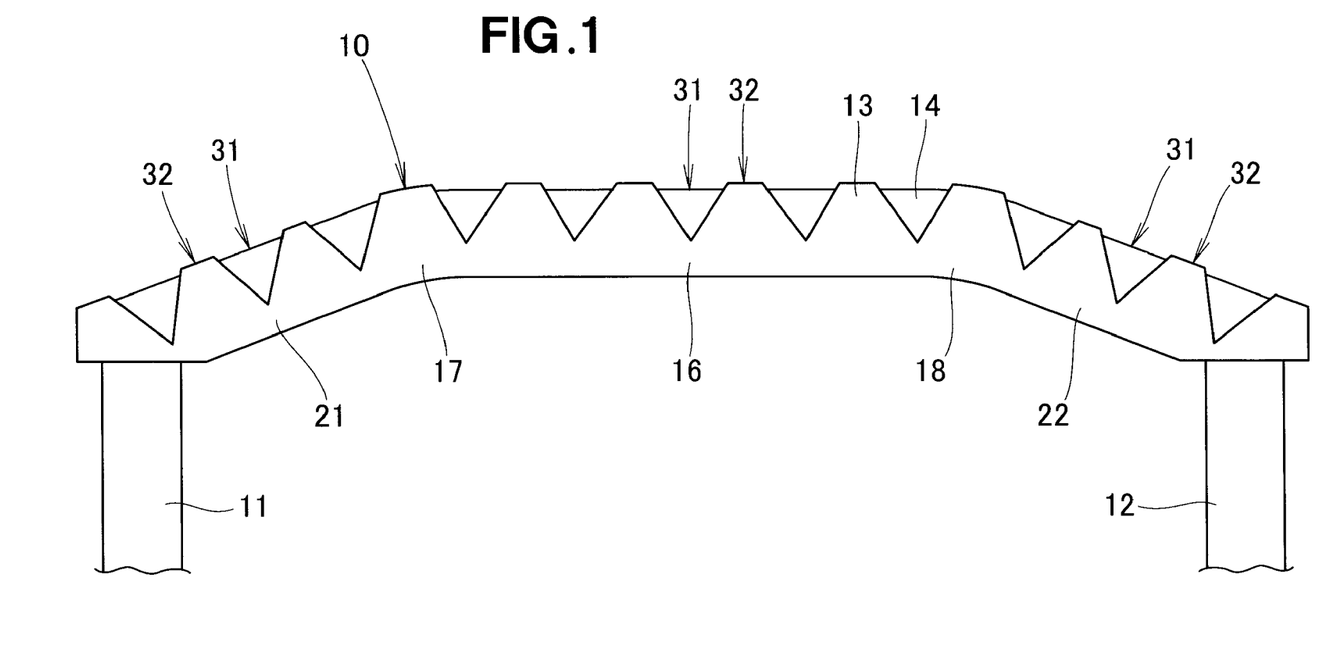
FIG. 1 is a plan view showing a bumper beam of an embodiment according to the present invention.

The bumper beam 10 is mounted on a pair of front-side frames 11, 12 provided to the left and right of a vehicle, respectively, as seen in FIG. 1.

The bumper beam 10 is formed of two superimposed steel plates 13, 14, and comprises a rectilinear central part 16, and rectilinear slanted parts 21, 22 integrally formed on the two ends of the central part 16, respectively, via curved parts 17, 18.

The slanted parts 21, 22 have external end parts that are set back from the central part 16, and the respective end parts are mounted on the front-side frames 11, 12.

Figure 2:
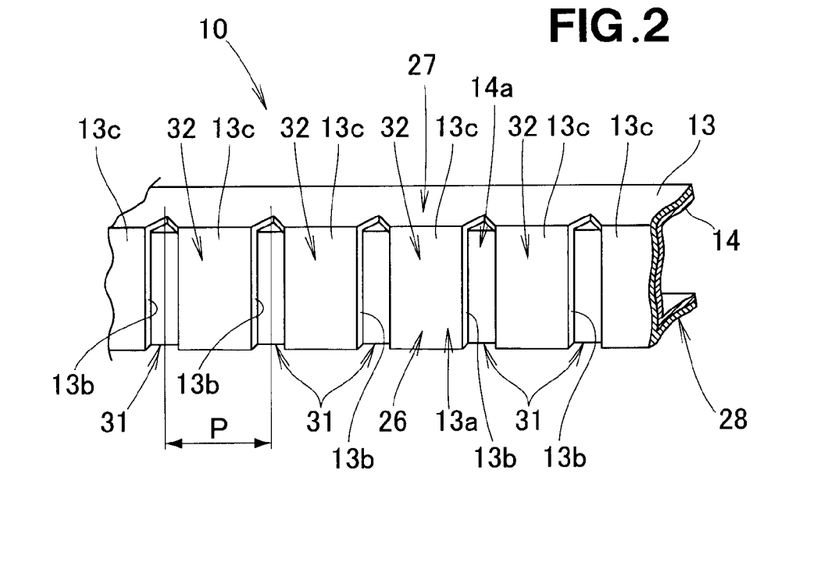
FIG. 2 is a perspective view in which a part of the bumper beam shown in FIG. 1 has been enlarged.

The bumper beam 10 is a member having a cross-sectional U shape comprising a front wall 26, an upper wall 27, and a lower wall 28. A plurality of weak parts 31 that extend in a vertical direction across the front end of the upper wall 27 and the front end of the lower wall 28 are formed in the front wall 26 at a predetermined pitch P along the lengthwise direction of the bumper beam 10, as shown in FIG. 2.

The front wall 26 comprises the respective front walls 13a, 14a of the steel plates 13, 14.

The weak parts 31 comprise slits 13b formed in the front wall 13a of the steel plate 13 and the front wall 14a of the steel plate 14.

Therefore, the thickness of the bumper beam 10 at the un-slitted parts 13c in which slits 13b are not formed in the front wall 13a of the steel plate 13 (in other words, the thickness of the non-weak parts 32 in which the weak parts 31 of the bumper beam 10 are not formed) is the thickness of the steel plate 13 combined with the thickness of the steel plate 14, and the thickness of the bumper beam 10 in the lengthwise direction varies because the thickness of the weak parts 31 of the bumper beam 10 in which slits 13b are formed is the thickness of the steel plate 14.

Next, a method of manufacturing the above-described bumper beam 10 will be described with reference to FIG. 3.

Figure 3:
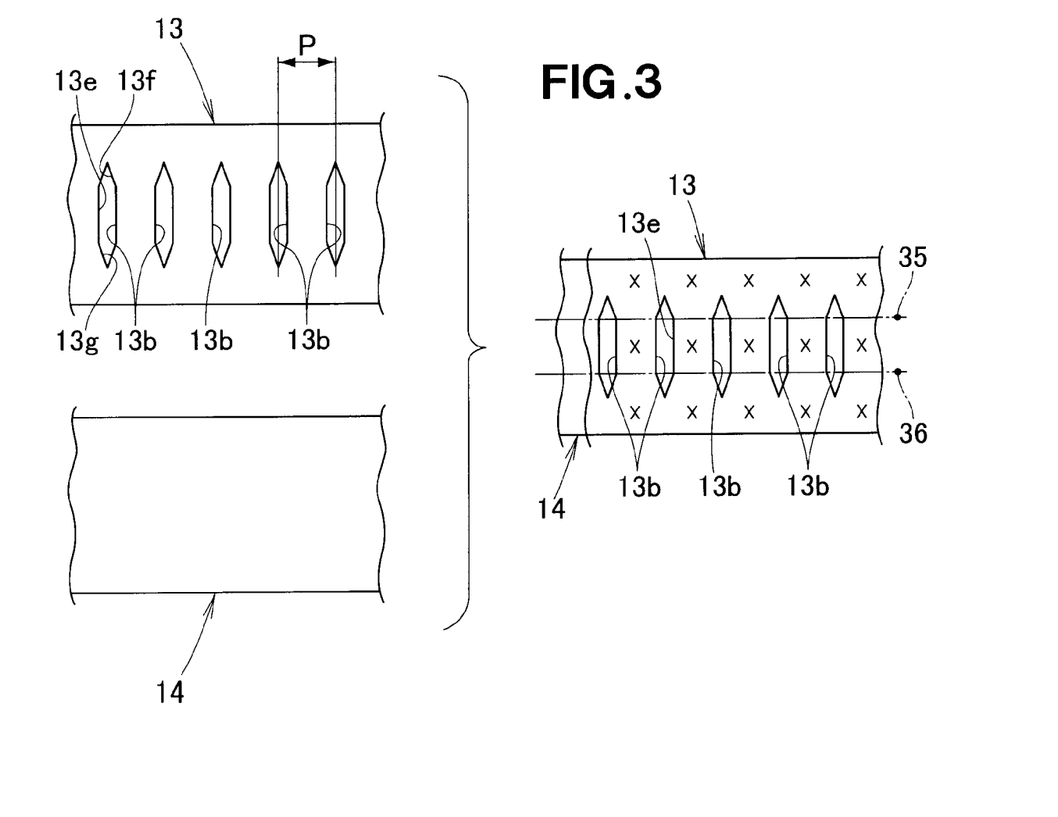
FIG. 3 is a view showing a method of manufacturing the bumper beam shown in FIG. 2.

Provided in FIG. 3 are a steel plate 13 in which a plurality of slits 13b orthogonal to the lengthwise direction of the bumper beam is formed at a predetermined pitch P in the lengthwise direction, and a steel plate 14 having substantially the same outer shape as the steel plate 13.

The slits 13b comprise rectangular aperture parts 13e having a long, thin rectangular shape, and triangular aperture parts 13f, 13g having a triangular shape formed above and below the rectangular aperture parts 13e.

Next, the steel plates 13, 14 are superimposed so that the steel plate 13 is the front side when mounted on a vehicle, and the portions other than the slits 13b are spot-welded. The X marks on the drawing are the spot welding locations.

The upper part and the lower part of the steel plates 13, 14 are bent rearward (in the direction of the rear side of the drawing) so as to follow along the dashed-and-dotted lines 35, 36 extending along the lengthwise direction passing through the upper and lower ends of the rectangular aperture parts 13e of each slit 13b. At this time, the slanted parts 21, 22 shown in FIG. 1 are also formed and the bumper beam 10 (FIG. 1) is completed.

Figure 4:
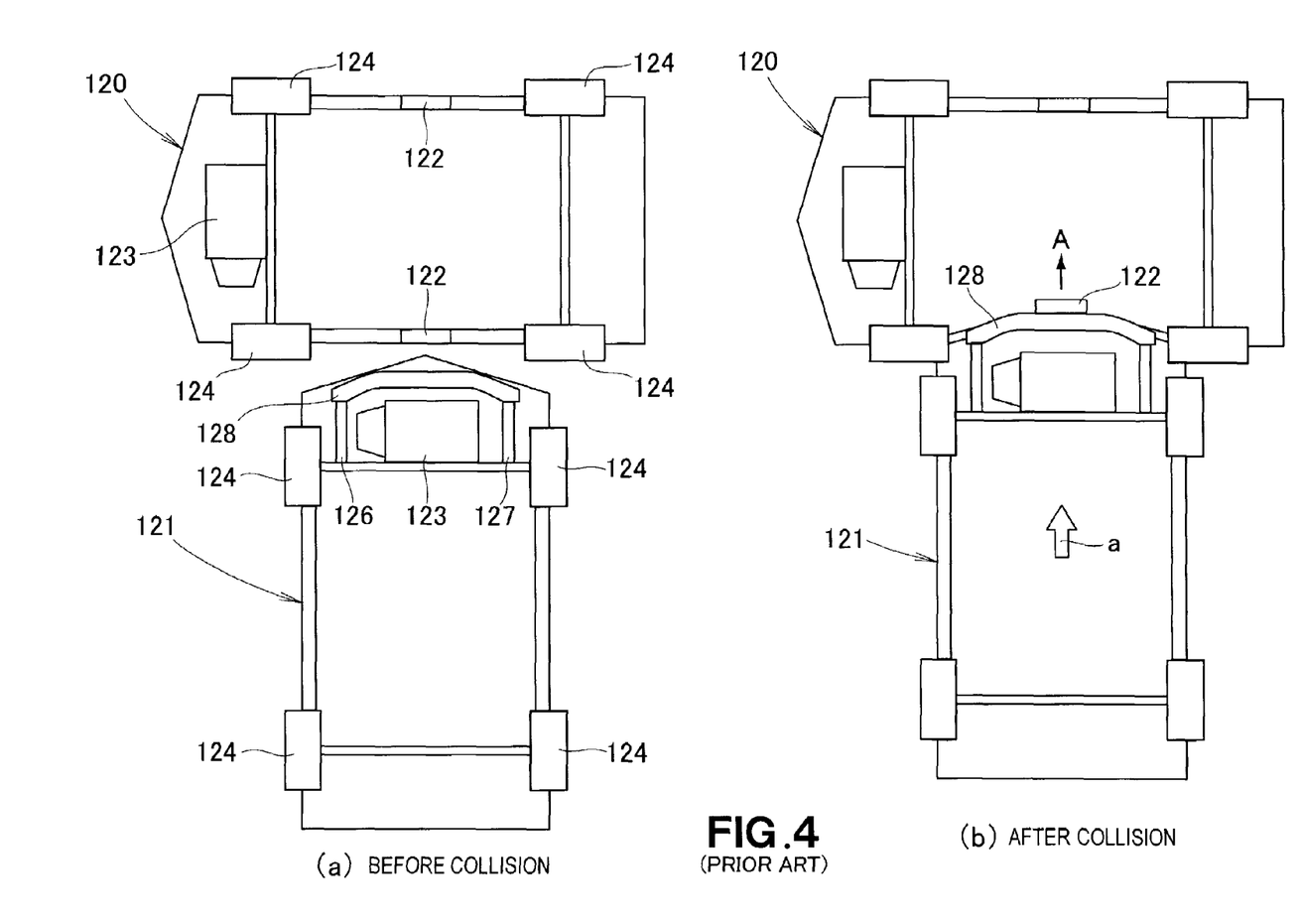
FIG. 4 is a view showing a state in which a vehicle provided with a bumper beam of the prior art is engaged in a side collision with another vehicle.

FIGS. 4 (a), (b) show examples in which a vehicle having a bumper beam of the prior art is engaged in a collision with a side surface of another vehicle.

FIG. 4 (a) shows a state just prior to the subject vehicle 121 engaging in a side collision with another vehicle 120.

The other vehicle 120 is provided with center pillars 122, 122 on the side parts of the vehicle body. The reference numeral 123 is an engine disposed in the forward part of the counterpart vehicle 120; and 124 indicates wheels.

The subject vehicle 121 is provided with a bumper beam 128 mounted on left and right front side frames 126, 127 on the front part of the vehicle body. The bumper beam 128 has a uniform rigidity in a lengthwise direction.

In FIG. 4(b), the subject vehicle 121 proceeds as shown by arrow a, and engages in a side collision with the counterpart vehicle 120. When the bumper beam 128 of the subject vehicle 121 strikes the center pillar 122 of the counterpart vehicle 120, the center pillar 122 deforms in the direction of the passenger compartment, as shown by the arrow A, because the rigidity of the bumper beam 128 is greater than the that of the center pillar 122.

Figure 5:
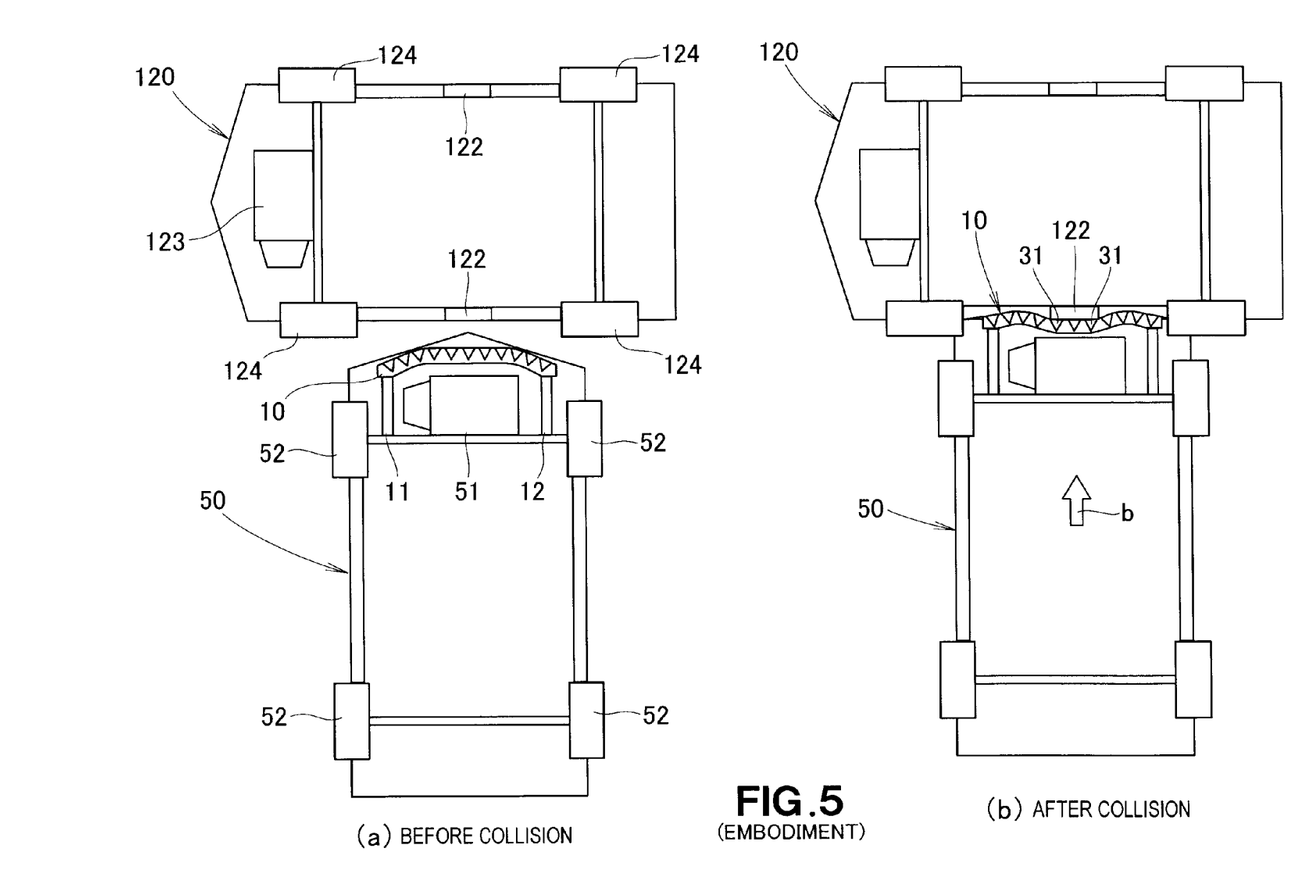
FIG. 5 is a view showing a state in which a vehicle provided with the bumper beam of the present embodiment is engaged in a side collision with another vehicle.

FIGS. 5 (a), (b) show examples in which a vehicle having the bumper beam of the present embodiment is engaged in a collision with a side surface of a counterpart vehicle.

FIG. 5 (a) shows a state just prior to the subject vehicle 50 engaging in a side collision with another vehicle 120.

The subject vehicle 50 is provided with a bumper beam 10 mounted on left and right front side frames 11, 12 on the front part of the vehicle body. The reference numeral 51 is an engine disposed in the forward part of the subject vehicle 50; and 52 indicates the wheels.

In FIG. 5 (b), the subject vehicle 50 proceeds as shown by arrow b, and engages in a side collision with a counterpart vehicle 120. When the bumper beam 10 of the subject vehicle 50 strikes the center pillar 122 of the counterpart vehicle 120, the bumper beam 10 deforms, with the weak part 31 near the collision location acting as the starting point because the collision surface area between the bumper beam and the center pillar 122 is small, and the deformation amount increases and the collision reaction force is reduced. As a result, the deformation of the center pillar 122 is reduced, and substantially no deformation occurs in the direction of the passenger compartment.

Figure 6:
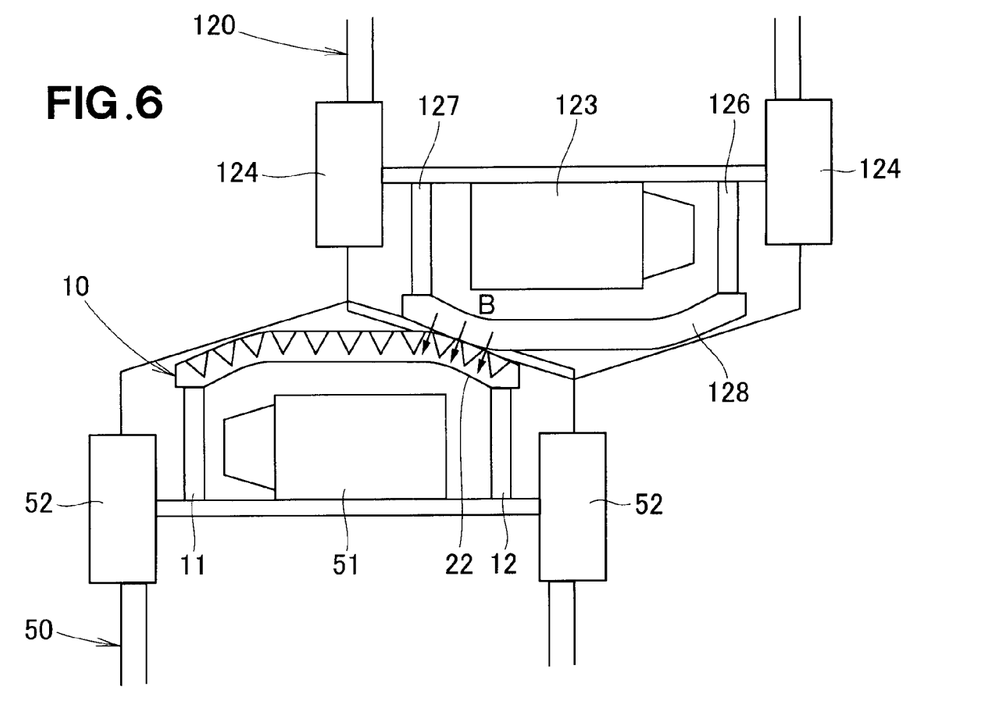
FIG. 6 is a view showing a state in which a vehicle provided with the bumper beam of the present embodiment is engaged in an offset collision with another vehicle.

FIG. 6 shows a state in which the subject vehicle 50 is engaged in a collision offset from a head-on collision with a counterpart vehicle 120.

At this time, the collision surface area increases when the bumper beam 10 of the subject vehicle 50, specifically, a plurality of non-weak parts 32 in the slanted part 22 of the bumper beam 10 (FIG. 1), strikes the bumper beam 128 provided to the counterpart vehicle 120. The collision load can be received over a wide range of the bumper beam 10, the collision reaction force can be increased, and considerable collision energy can be absorbed because a distributed load is applied as shown by the plurality of arrows B on the bumper beam 10.

Figure 7:
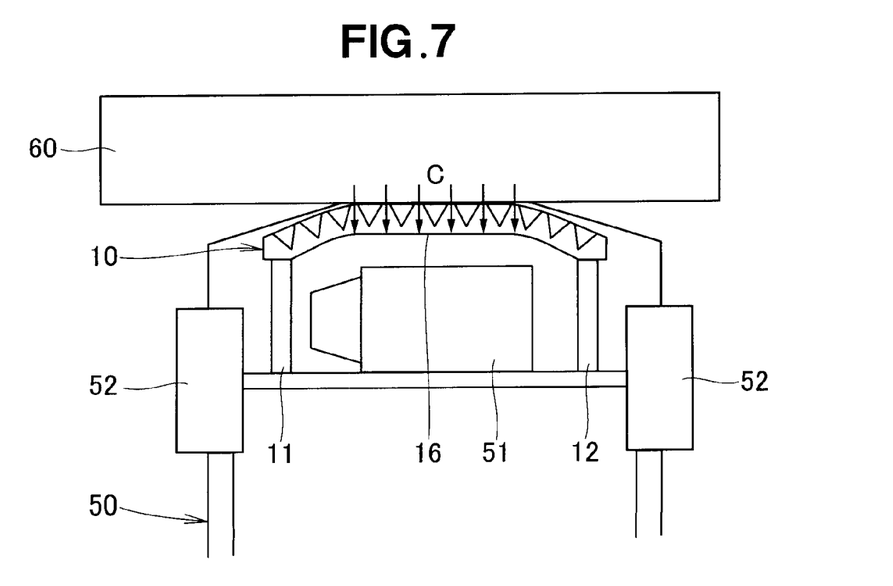

FIG. 7 shows a state in which the subject vehicle 50 is engaged in a head-on collision with, e.g., a wall 60 of a building structure or the like.

At this time, the collision surface area increases in the same way as in the offset collision when the bumper beam 10 of the subject vehicle 50, specifically, a plurality of non-weak parts 32 in the central part 16 of the bumper beam 10 (FIG. 1), strikes the wall 60. The collision load can be received over a wide range of the bumper beam 10, and considerable collision energy can be absorbed because a distributed load is applied as shown by the plurality of arrows C on the bumper beam 10.

Figure 8A:
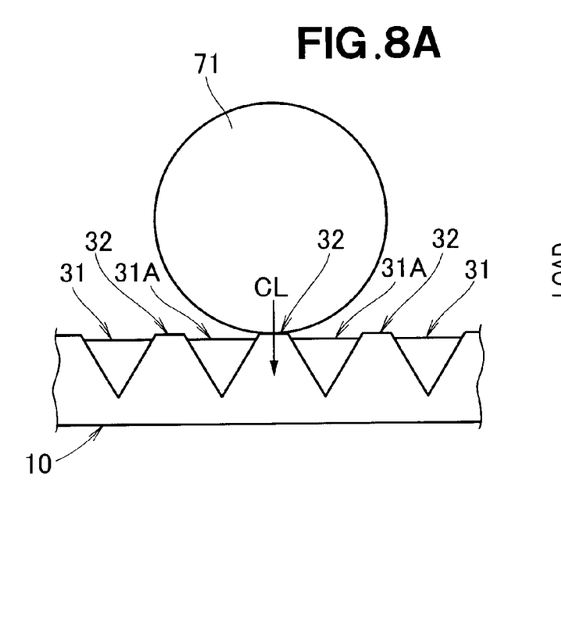
FIG. 8A shows the state of a bumper beam having collided with a small collision object.
Figure 8B:
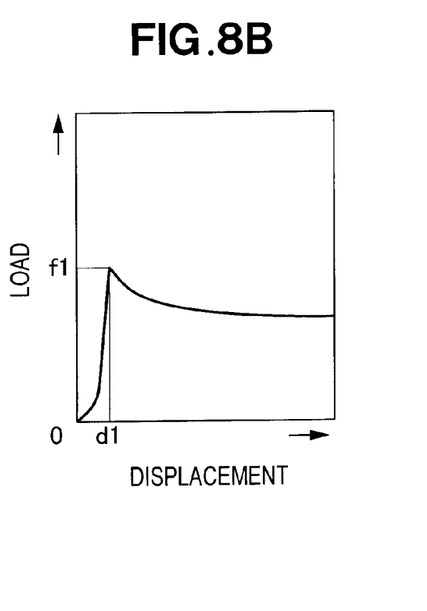
FIG. 8B is a graph showing the relationship between displacement of the bumper beam and the load generated in the bumper beam in the collision shown in FIG. 8A.

FIG. 8A shows the state of a bumper beam 10 having collided with, e.g., a small collision object 71, and FIG. 8B shows a graph that shows the relationship between the displacement of the bumper beam 10 and the load generated in the bumper beam 10 in the collision shown in FIG. 8A.

In FIG. 8A, when the bumper beam 10 collides with the object 71 having a small collision surface area, the bumper beam 10 is deformed so that a weak part 31A (the same as a weak part 31, but designated differently to be distinguishable from other weak parts 31) near the collision location acts as a starting point because a concentrated load CL from the object 71 is applied to the bumper beam 10.

When the bumper beam 10 collides with the object 71 and the bumper beam 10 begins to be displaced, the load rapidly increases, and the entire bumper beam 10 deforms, and when the displacement reaches d1 and the load reaches f1, the weak part 31A begins to deform and the load stops increasing even when the displacement increases, as shown in FIG. 8B. In other words, the collision reaction force is suppressed. Thus, deformation of the object 71 can be suppressed in the absence of a load increase.

Figure 9A:
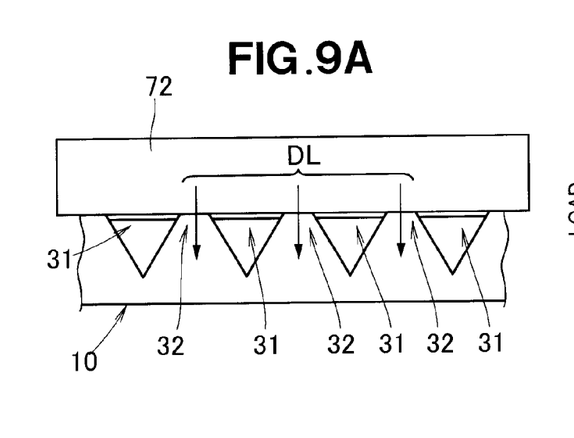
FIG. 9A shows the state of a bumper beam having collided with a large collision test object.
Figure 9B:
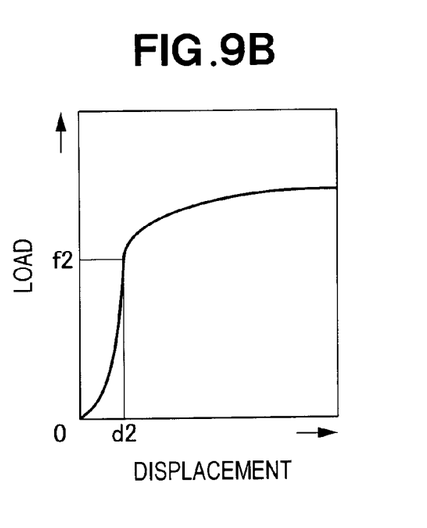
FIG. 9B is a graph showing the relationship between the displacement of the bumper beam and the load generated in the bumper beam in the collision shown in FIG. 9A.

FIG. 9A shows the state of a bumper beam 10 having collided with, e.g., a large collision object 72, and FIG. 9B shows a graph that shows the relationship between the displacement of the bumper beam 10 and the load generated in the bumper beam 10 in the collision shown in FIG. 9A.

In FIG. 9A, when the bumper beam 10 collides with the object 72 having a large collision surface area, the bumper beam 10 deforms uniformly overall because a distributed load DL from the object 72 is applied to the bumper beam 10.

When the bumper beam 10 collides with the object 72, the bumper beam 10 begins to be displaced, the load rapidly increases, and the bumper beam 10 deforms overall, as shown in FIG. 9B. When the displacement exceeds d2 and the load exceeds f2, the load increase is reduced in relation to the displacement, but overall deformation of the bumper beam 10 continues, and a load increase continues until a considerable displacement is reached. Therefore, the amount of collision energy that is absorbed is increased, and the impact at the time of collision can be effectively absorbed.

Figure 10:
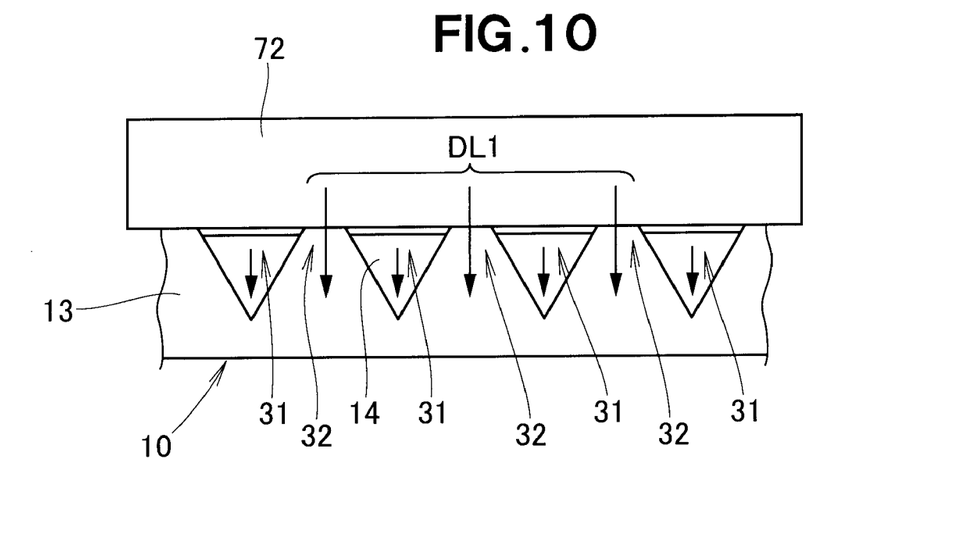
FIG. 10 is a view showing a state in which the plate thickness between weak parts and non-weak parts of the bumper beam has been modified.

FIG. 10 shows a change in the load on the bumper beam when the plate thickness of the weak parts 31 and the non-weak parts 32 has been modified.

When the bumper beam 10 has collided with the object 72 having a large surface area, a distributed load DL1 from the object 72 is applied to the non-weak parts 32 of bumper beam 10, and the bumper beam 10 deforms uniformly overall because the distributed load DL1 is also applied to the steel plate 14 of the weak parts 31 via the non-weak parts 32, as seen in FIG. 10.

The load (the collision reaction force) can be controlled by modifying the difference in the plate thickness of the non-weak parts 32 and the weak parts 31.

Figure 11:
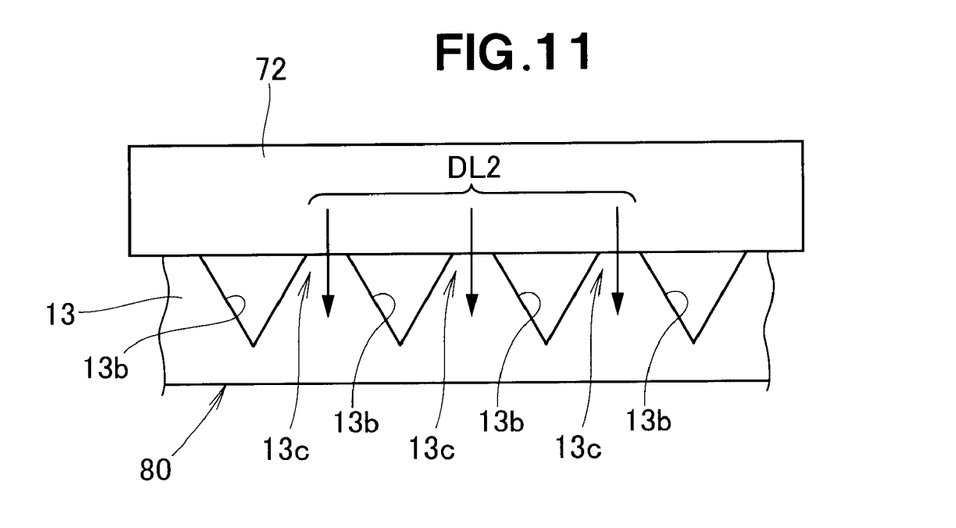
FIG. 11 is a view showing a bumper beam of another embodiment manufactured from a single steel plate.

FIG. 11 shows another embodiment of the bumper beam according to the present invention.

The bumper beam 80 of another embodiment shown in FIG. 11 comprises a single steel plate 13. A plurality of slits 13b is provided at a predetermined pitch P (see FIG. 2) along the lengthwise direction of the bumper beam 80. The slits 13b are the weak parts, and the un-slitted parts 13c are the non-weak parts.

When the bumper beam 80 has collided with an object 72, a distributed load DL2 from the object 72 is applied to the un-slitted parts 13c, which are the non-weak parts of bumper beam 80, and since the load is not transmitted to the slits 13b, which are the weak parts, the bumper beam 10 deforms evenly overall, but the load is reduced to less than that of the case of the bumper beam 10 shown in FIG. 10.

The load (the collision reaction force) can be controlled by modifying the thickness of the steel plate 13 in the bumper beam 30.

The present invention is configured so that a plurality of weak parts 31 extending in the vertical direction on a front surface 26 of the bumper beam 10 is formed at a predetermined pitch P along the lengthwise direction of a bumper beam 10 having a cross-sectional U shape or rectangular shape in the manner shown in FIGS. 2, and 5 through 7. Therefore, a difference in rigidity is generated by the plurality of weak parts 31, and the collision reaction force generated in accordance with the surface area of the contact with the collision object can be made to be different.

For example, in a side collision, the collision reaction force is suppressed when the bumper beam 10 of the subject vehicle 50 deforms about a weak part 31 as a starting point when a collision occurs with the center pillar 122 having a small surface and belonging to a counterpart vehicle 120, deformation of the center pillar 122 is suppressed, and the counterpart vehicle 120 can be protected.

Considerable collision reaction force is generated in an offset collision (or a head-on collision), considerable collision energy is absorbed, and the subject vehicle 50 can be protected by accommodating a collision load over a wide surface area of the bumper beam 10 of the subject vehicle 50 in a collision with a large surface area, e.g., the bumper beam 128 (or a wall surface) of a counterpart vehicle 120 (or a wall 60).

In the present invention, two or more steel plates 13, 14 are superimposed, and slits 13*b* are formed in at least one of the steel plates 13 to obtain weak parts 31. Therefore, a difference in plate thickness is formed between a portion in which two or more steel plates 13, 14 are superimposed and a portion in which slits 13*b* are formed. A load generated by the collision surface area with a collision object can thereby be made to be different. Moreover, the slits 13*b* can readily be formed by press molding.

In the present embodiment, the bumper beam 10 is configured to have a U-shaped open cross section, as shown in FIG. 2, but no limitation is imposed thereby, and the bumper beam may have a rectangular cross section.

The weak parts 31 were configured as slits extending vertically, as shown in FIG. 2, but no limitation is imposed thereby, and it is possible to adopt an aperture having a circular shape, an elliptical shape, an oval shape, a rectangular shape, or a shape similar to these shapes.

Obviously, various minor changes and modifications of the present invention are possible in light of the above teaching. It is therefore to be understood that within the scope of the appended claims the invention may be practiced otherwise than as specifically described.

What is claimed is:

1. A bumper beam structure for a vehicle, comprising:
   a bumper beam having one of a U shape and a rectangular shape in cross section and extending transversely of the vehicle; and
   a plurality of weak parts provided on a front surface of the bumper beam such that the weak parts extend vertically,
   wherein each of the plurality of weak parts are provided at a predetermined pitch along a length of the bumper beam,
   wherein the bumper beam is configured by superimposing at least two plates and the plurality of weak parts is configured by forming a plurality of slits in at least one of the plates, and
   wherein each of the plurality of slits comprises a long, thin rectangular aperture and a triangular aperture formed on upper and lower ends of the rectangular apertures.

2. The bumper beam structure of claim 1, wherein the at least two plates each have a different plate thickness.

3. The bumper beam structure of claim 1, wherein an area between weak parts in the plurality of weak parts provided at a predetermined pitch comprises a non-weak part.

* * * * *